(12) United States Patent
Wu et al.

(10) Patent No.: US 8,077,564 B2
(45) Date of Patent: Dec. 13, 2011

(54) METHOD FOR IMPROVING READABILITY OF AN OPTICAL DISC, AND ASSOCIATED OPTICAL STORAGE APPARATUS

(75) Inventors: Ming-Tsang Wu, Hsinchu County (TW); Hao-Hui Yin, Hsinchu (TW); Chih-Ching Yu, Hsinchu (TW); Tzu-Ching Yang, Taipei (TW); Ya-Fang Nien, Hsin-Chu (TW); Ying-Feng Huang, Chia-Yi Hsien (TW); Pi-Hai Liu, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 248 days.

(21) Appl. No.: 12/436,146

(22) Filed: May 6, 2009

(65) Prior Publication Data

US 2010/0284256 A1  Nov. 11, 2010

(51) Int. Cl.
*G11B 7/00* (2006.01)
(52) U.S. Cl. ............... 369/44.27; 369/53.45; 369/53.37
(58) Field of Classification Search ............... 369/53.12, 369/53.15, 53.34
See application file for complete search history.

(56) References Cited

U.S. PATENT DOCUMENTS

2009/0154324 A1* 6/2009 Sato et al. ............... 369/112.23

FOREIGN PATENT DOCUMENTS

CN 101313358 A 11/2008
WO WO 2007060975 A1 * 5/2007

* cited by examiner

*Primary Examiner* — Adam R Giesy
(74) *Attorney, Agent, or Firm* — Winston Hsu; Scott Margo (57) ABSTRACT

A method for improving readability of an optical disc includes: changing a first control parameter of an optical storage apparatus that accesses the optical disc and obtaining a plurality of associated values of an index corresponding to the readability of the optical disc for respective changed/unchanged values of the first control parameter; setting the first control parameter to be an optimal value out of the changed/unchanged values of the first control parameter according to the index; changing a second control parameter with the first parameter set to be the optimal value to obtaining a plurality of associated values of the index for respective changed/unchanged values of the second control parameter; and setting the second control parameter to be an optimal value according to the index. The control parameters having their individual optimal values are utilized for further control during decoding. In addition, an associated optical storage apparatus is further provided.

25 Claims, 7 Drawing Sheets

# METHOD FOR IMPROVING READABILITY OF AN OPTICAL DISC, AND ASSOCIATED OPTICAL STORAGE APPARATUS

BACKGROUND

The present invention relates to optical disc drives, and more particularly, to a method for improving readability of an optical disc, and to an associated optical storage apparatus.

As multimedia applications continue to progress, the demand for storing massive digital data increases rapidly. As a result, optical storage media such as Digital Versatile Discs (DVDs) or Blu-ray Discs (BD) are very popular because of their high storage volume and compact size characteristics, and therefore, optical disc drives such as DVD drives or BD drives have become standard accessories of personal computers, utilized for performing the multimedia applications.

For a conventional optical disc drive, decoding error and low readability problems may arise due to some manufacturing or assembling issues. For example, an optical disc may have a bended shape, which may cause low readability. In another example, an optical pickup unit (OPU) of the optical disc drive may be improperly assembled or aligned, which may cause the so-called tilt problem. According to the related art, the conventional optical disc drive typically selects a single control parameter that is determined to be changed, and then merely assigns a changed value to the single control parameter while keeping other control parameters unchanged. That is, when the change of a first control parameter is not helpful on solving the problems, the conventional optical disc drive typically keeps the first control parameter unchanged, and then tries with another control parameter.

According to the related art, the conventional optical disc drive may treat an optical disc as an unreadable disc even the optical disc is not so bad. Thus, a novel method is required for improving readability of the optical disc.

SUMMARY

It is therefore an objective of the present invention to provide a method for improving readability of an optical disc, and to provide an associated optical storage apparatus, in order to solve the above-mentioned problems.

An exemplary embodiment of a method for improving readability of an optical disc comprises: changing a first control parameter of an optical storage apparatus that accesses the optical disc and obtaining a plurality of associated values of an index corresponding to the readability of the optical disc for respective changed/unchanged values of the first control parameter; and setting the first control parameter to be an optimal value out of the changed/unchanged values of the first control parameter according to the associated values of the index. The method further comprises: changing a second control parameter of the optical storage apparatus with the first control parameter set to be the optimal value and obtaining a plurality of associated values of the index for respective changed/unchanged value of the second control parameter; setting the second control parameter to be an optimal value out of the changed/unchanged values of the second control parameter according to the associated values of the index that are obtained for the respective changed/unchanged values of the second control parameter; and utilizing the first and the second control parameters having their individual optimal values for further control during decoding.

An exemplary embodiment of an associated optical storage apparatus comprises a read channel, a servo control module, and a parameter tuning enhancement (PTE) device. The read channel is arranged to read information from an optical disc, where the read channel comprises a waveform equalizer, a slicer, a phase locked loop (PLL), and a demodulating and decoding module. The servo control module is arranged to perform servo control for the optical storage apparatus. In addition, the PTE device is arranged to improve readability of the optical disc. In particular, the PTE device is arranged to change a first control parameter of the optical storage apparatus that accesses the optical disc and obtain a plurality of associated values of an index corresponding to readability of the optical disc for respective changed/unchanged values of the first control parameter, where the PTE device is further arranged to set the first control parameter to be an optimal value out of the changed/unchanged values of the first control parameter according to the associated values of the index. The PTE device changes a second control parameters of the optical storage apparatus with the first control parameter set to be the optimal value and obtains a plurality of associated values of the index for respective changed/unchanged values of the second control parameters, and the PTE device is further arranged to set the second control parameter to be an optimal value out of the changed/unchanged value of the second control parameter according to the associated values of the index that are obtained for the respective changed/unchanged values of the second control parameter. Please note that the PTE device changes the second control parameter while the first control parameter is set to be the optimal value of the first control parameter. The first and the second control parameters having their individual optimal values are utilized for further control during decoding. Additionally, the first and the second control parameters are utilized for controlling at least a portion of the waveform equalizer, the slicer, the PLL, the demodulating and decoding module, and the servo control module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
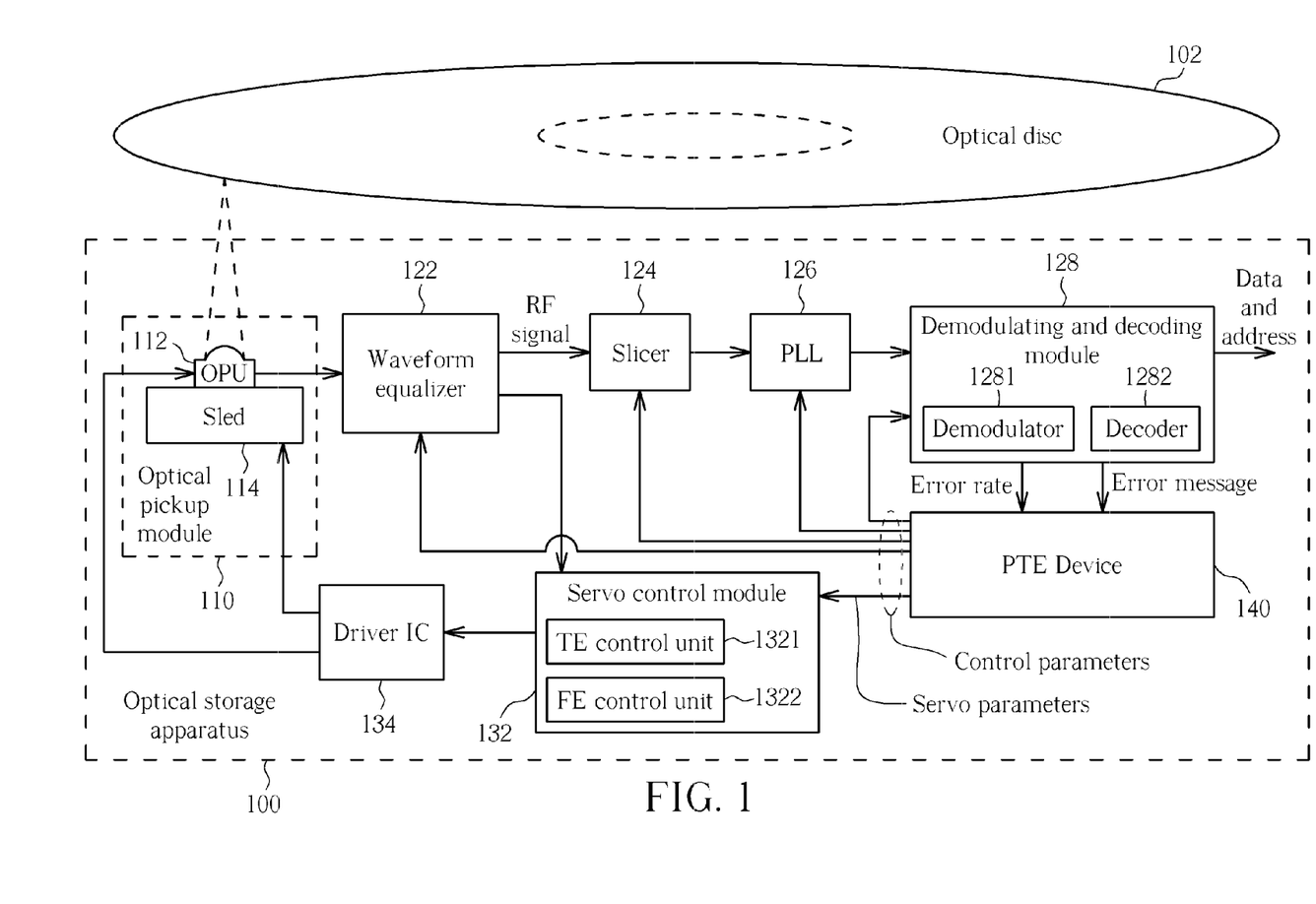
FIG. 1 is a diagram of an optical storage apparatus according to a first embodiment of the present invention.

Please refer to FIG. 1, which illustrates a diagram of an optical storage apparatus 100 according to a first embodiment of the present invention. The optical storage apparatus 100 comprises an optical pickup module 110 comprising an optical pickup unit (OPU) 112 (labeled "OPU" in FIG. 1) and a sled 114, and further comprises a read channel comprising a waveform equalizer 122, a slicer 124, a phase locked loop (PLL) 126 (labeled "PLL" in FIG. 1), and a demodulating and decoding module 128, where the demodulating and decoding module 128 comprises a demodulator 1281 and decoder 1282. In addition, the optical storage apparatus 100 further comprises, a servo control module 132 comprising at least a tracking error (TE) control unit 1321 (labeled "TE control unit" in FIG. 1) and a focus error (FE) control unit 1322 (labeled "FE control unit" in FIG. 1), a driver integrated circuit (IC) 134 (labeled "Driver IC" in FIG. 1), and a parameter tuning enhancement (PTE) device 140 (labeled "PTE device" in FIG. 1). In this embodiment, the optical storage apparatus 100 is substantially an optical disc drive that accesses an optical disc 102. This is for illustrative purposes only, and is not meant to be a limitation of the present invention. According to a variation of this embodiment, the optical storage apparatus can be a control circuit positioned within the optical disc drive. For example, the control circuit of this variation comprises the aforementioned read channel, the servo control module 132, and the PTE device 140.

According to this embodiment, under control of the driver IC 134, the OPU 112 is arranged to emit Laser and pick up an optical signal reflected from the optical disc 102, and the sled 114 is arranged to adjust at least the radial location of the OPU 112 with respect to a track on the optical disc 102. This is for illustrative purposes only, and is not meant to be a limitation of the present invention. Please note that, in addition to the sled 114, the optical pickup module 110 may comprise some additional optical or mechanical adjustment components according to different variations of this embodiment, where the additional optical or mechanical adjustment components can be driven by the driver IC 134.

In this embodiment, the read channel mentioned above is arranged to read information from the optical disc 102 through the OPU 112. More specifically, the waveform equalizer 122 performs waveform equalization on a radio frequency (RF) signal of the optical storage apparatus 100 to obtain an equalized version thereof (simply labeled "RF signal" in FIG. 1), which is then sliced by the slicer 124 and phase locked by the PLL 126 for obtaining digital information recorded on the optical disc 102. As a result, the demodulator 1281 demodulates a phase locked signal received from the PLL 126 to generate a demodulated signal, and the decoder 1282 decodes the demodulated signal to obtain data and associated addresses. In addition, the servo control module 132 is arranged to perform servo control for the optical storage apparatus 100, where the TE control unit 1321 performs TE control according to a TE signal, and the FE control unit 1322 performs FE control according to an FE signal, where both the TE and FE signals are known by those skilled in the art. According to the architecture shown in FIG. 1, the servo control module 132 is capable of controlling the optical pickup module 110 by utilizing the driver IC 134.

As shown in FIG. 1, the PTE device 140 controls the read channel mentioned above and the servo control module 132 according to a plurality of control parameters of the optical storage apparatus 100, where the plurality of control parameters comprises at least one servo parameter (e.g. one or more servo parameters) for controlling the servo control module 132. The PTE device 140 of this embodiment is arranged to improve readability of the optical disc 102. Implementation details regarding operations of the PTE device 140 are further described by referring to FIG. 2.

Figure 2:
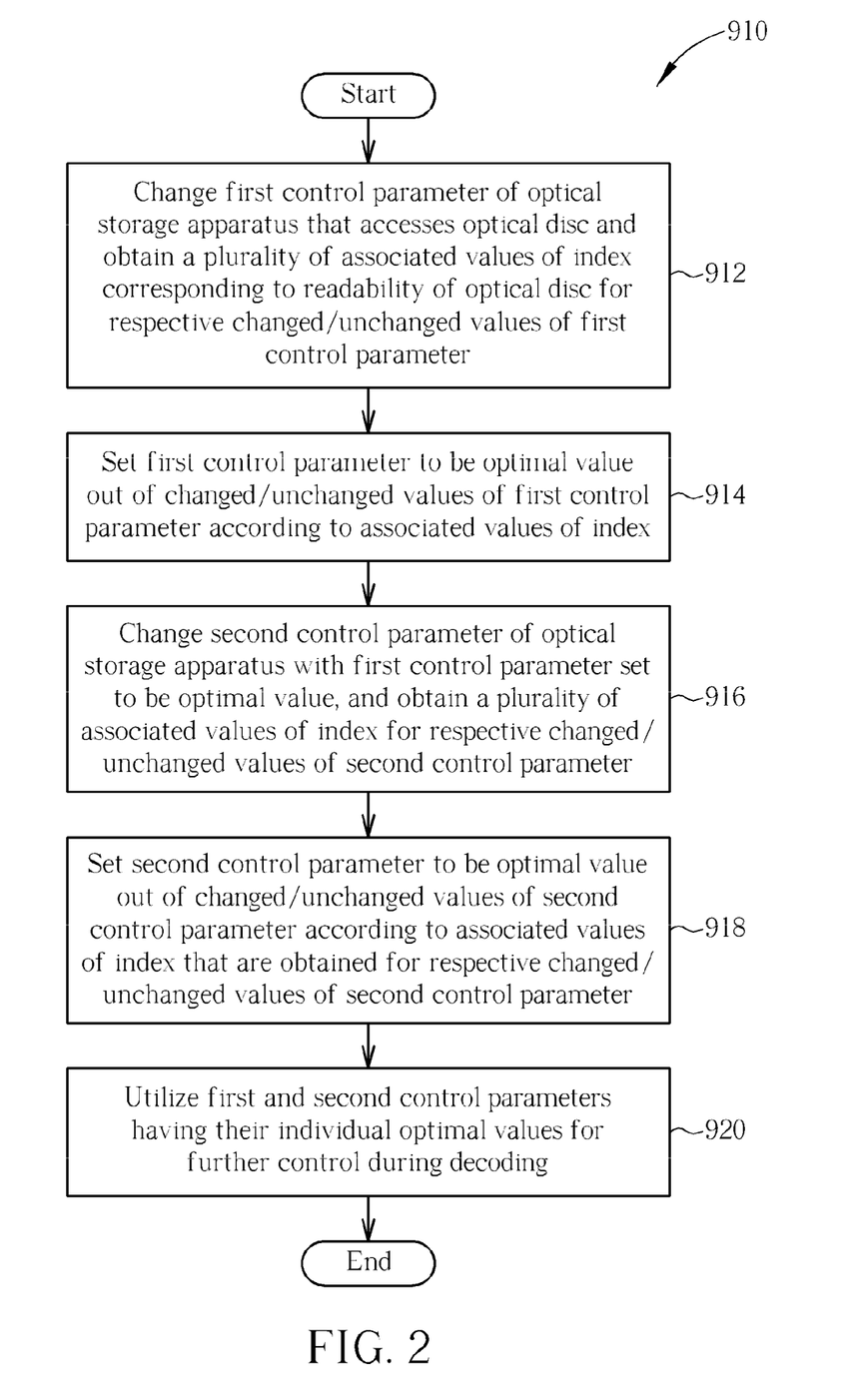
FIG. 2 is a flowchart of a method for improving readability of an optical disc according to one embodiment of the present invention.

FIG. 2 is a flowchart of a method 910 for improving readability of an optical disc according to one embodiment of the present invention. The method 910 can be applied to the optical storage apparatus 100 shown in FIG. 1, and can be implemented by utilizing the optical storage apparatus 100 or a varied version thereof. The method 910 is described as follows.

In Step 912, the PTE device 140 changes a first control parameter of the optical storage apparatus 100 that accesses the optical disc 102 and obtains a plurality of associated values of an index corresponding to the readability of the optical disc 102 for respective changed/unchanged values of the first control parameter.

In Step 914, the PTE device 140 sets the first control parameter to be an optimal value out of the changed/unchanged values of the first control parameter according to the associated values of the index. According to this embodiment, the optimal value of the first control parameter corresponds to an extreme value out of the associated values obtained for the respective changed/unchanged values of the first control parameter, and the first control parameter having its optimal value is utilized for further control during decoding.

In Step 916, the PTE device 140 changes a second control parameter of the optical storage apparatus 100 with the first control parameter set to be the optimal value, and obtains a plurality of associated values of the index for respective changed/unchanged values of the second control parameter.

In Step 918, the PTE device 140 sets the second control parameter to be an optimal value out of the changed/unchanged values of the second control parameter according to the associated values of the index that are obtained for the respective changed/unchanged values of the second control parameter. According to this embodiment, the optimal value of the second control parameter corresponds to an extreme value out of the associated values obtained for the respective changed/unchanged values of the second control parameter, and the second control parameter having its optimal value is utilized for further control during decoding.

In Step 920, the optical storage apparatus 100 utilizes the first and the second control parameters having their individual optimal values for further control during decoding.

Please note that the PTE device 140 changes the second control parameter while the first control parameter is set to be the optimal value of the first control parameter. This is for illustrative purposes only, and is not meant to be a limitation of the present invention. According to a variation of this embodiment, in a situation where the plurality of control parameters further comprises a third control parameter to be tuned by the PTE device 140, the PTE device 140 changes the third control parameter while the second control parameter is set to be the optimal value of the second control parameter.

According to this embodiment, the control parameters mentioned above are utilized for controlling the waveform equalizer 122, the slicer 124, the PLL 126, the demodulating and decoding module 128, and the servo control module 132, respectively. This is for illustrative purposes only, and is not meant to be a limitation of the present invention. According to a variation of this embodiment, the control parameters are utilized for controlling at least a portion of the waveform equalizer 122, the slicer 124, the PLL 126, the demodulating and decoding module 128, and the servo control module 132.

In this embodiment, at least a portion of the associated values of the index is generated during a decoding operation. The PTE device 140 is arranged to monitor at least the portion of the associated values of the index, such as one or more error rates, and monitor one or more error messages (if exist). In practice, the PTE device 140 triggers the changing and setting operations of the control parameters (i.e. the changing operations and the setting operations disclosed in FIG. 2) by comparing the associated values or a derivative of the associated value with a predetermined threshold value. For example, in a situation where the aforementioned at least one associated value or the derivative of the associated value reaches the predetermined threshold value, the PTE device 140 triggers the changing and setting operations of the control parameters.

In particular, a portion of the optical storage apparatus 100 is arranged to generate at least a portion of the associated values of the index during a decoding operation. For example, the index represents an error rate of the optical storage apparatus 100, where the error rate is generated by the demodulating and decoding module 128. More particularly, the demodulating and decoding module 128 of this embodiment can generate an error rate as one of the associated values of the index during a decoding operation. This is for illustrative purposes only, and is not meant to be a limitation of the present invention. According to a variation of this embodiment, the index represents a jitter detection result of the optical storage apparatus 100. For example, the jitter detection result of this variation can be generated by the demodulating and decoding module 128.

According to another variation of this embodiment, the index represents a measurement result of the RF signal of the optical storage apparatus 100, or represents a measurement result of a derivative of the RF signal (e.g. the equalized version thereof, or a Radio Frequency Ripple (RFRP) signal). According to another variation of this embodiment, the index represents a measurement result of a servo signal of the servo control module 132 (e.g. the TE signal or the FE signal), or represents a measurement result of a derivative of the servo signal.

Figure 3:
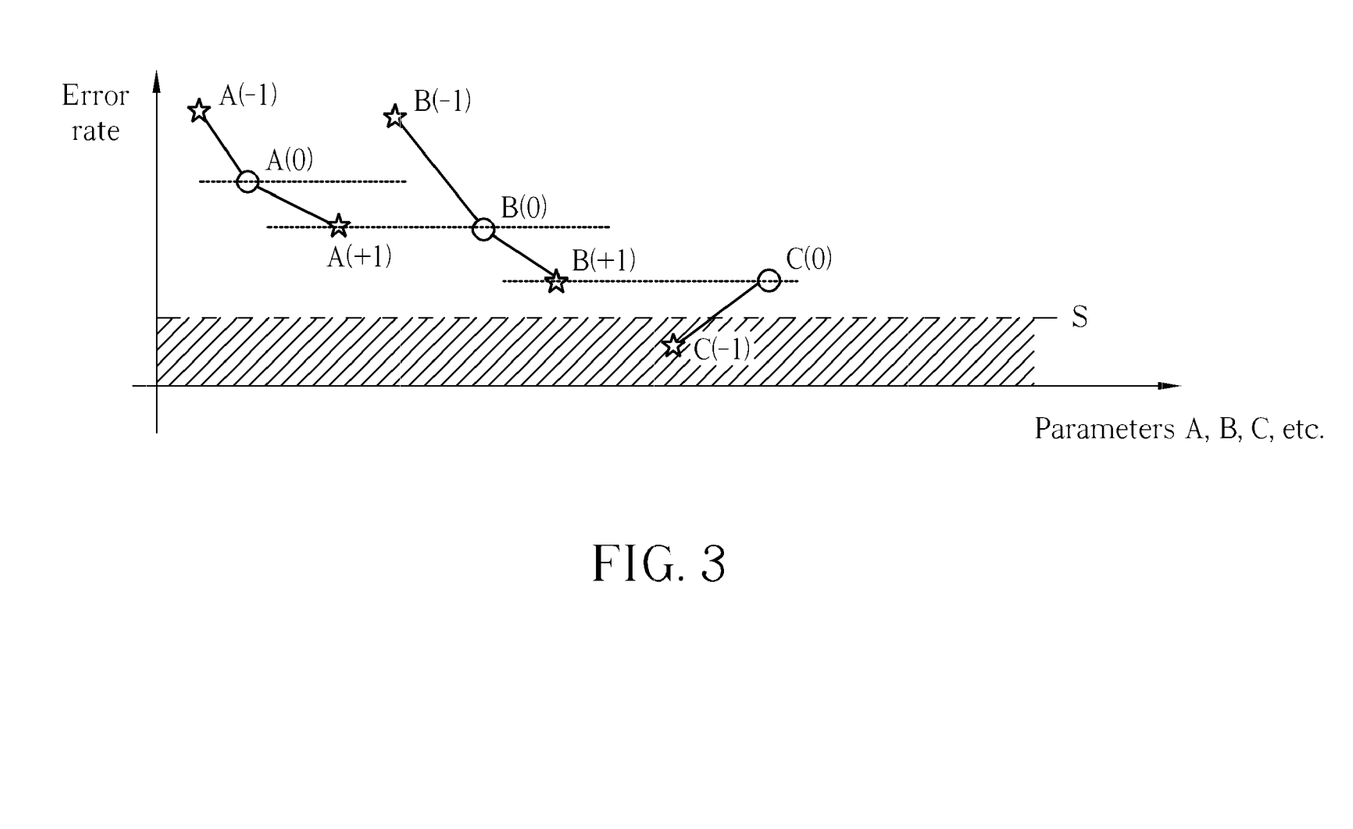
FIG. 3 illustrates associated values respectively obtained for some changed/unchanged values of the control parameters involved with the method shown in FIG. 2 according to an embodiment of the present invention.

FIG. 3 illustrates associated values respectively obtained for some changed/unchanged values of the control parameters A, B, C, etc. involved with the method 910 shown in FIG. 2 according to an embodiment of the present invention. As shown in FIG. 3, the vertical axis is labeled "Error rate" and the horizontal axis is labeled "Parameters A, B, C, etc." More specifically, the curves illustrated in FIG. 3 represent the relationships between the index (e.g. an error rate) and the control parameters A, B, C, etc. Please note that the notations A(0), B(0), and C(0) represent respective unchanged values of the control parameters A, B, and C, while the others such as {A(−1), A(+1)}, {B(−1), B(+1)}, and {C(−1)} represent respective changed values of the control parameters A, B, and C.

As shown in FIG. 3, the shaded region below the dashed line labeled "S" represents an acceptable error rate region. According to this embodiment, a decoding operation having an error rate falling within the acceptable error rate region can be considered a successful decoding operation. When an associated value (e.g. an error rate, in this embodiment) obtained is found to be within a predetermined range of the index, such as the range of the acceptable error rate region mentioned above, the PTE device 140 determines the current values of the control parameters to be optimal values.

For example, referring to FIG. 3, the control parameter A is first changed from A(0) to A(−1) and A(+1), since the error rate for A(+1) is most close to the predetermined range of the index, the control parameter A is set as A(+1). The PTE device 140 then changes the control parameter B from B(0) to B(−1) and B(+1) and set the control parameter B as B(+1) as the error rate for B(+1) is most close to the predetermined range of the index. The PTE device 140 changes parameter C from C(0) to C(−1). The error rate obtained for the changed value C(−1) of the control parameter C is found to be within the predetermined range of the index (i.e. the error rate obtained for the changed value C(−1) falls within the shaded region shown in FIG. 3), the PTE device 140 determines the changed value C(−1) to be the optimal value of the control parameter C. The changed values A(+1) and B(+1) are also determined to be the optimal value of the control parameter A and B respectively.

More specifically, in a situation where none of the associated values (e.g. error rates) respectively obtained for the changed/unchanged values of a control parameter falls within the shaded region shown in FIG. 3, the value of the control parameter with an associated value found to be most close to the shaded region shown in FIG. 3 among other values is set, and the PTE device 140 starts to change the value for other control parameter until the associated value falls within the shaded region.

Regarding the control parameters A and B, the PTE device 140 of this embodiment changes the specific control parameter (e.g. the control parameter A, or the control parameter B) only twice before switching to change another control parameter. For example, the changed/unchanged values of the control parameter A comprise only a first changed value A(−1), a second changed value A(+1), and an unchanged value A(0).

Figure 4:
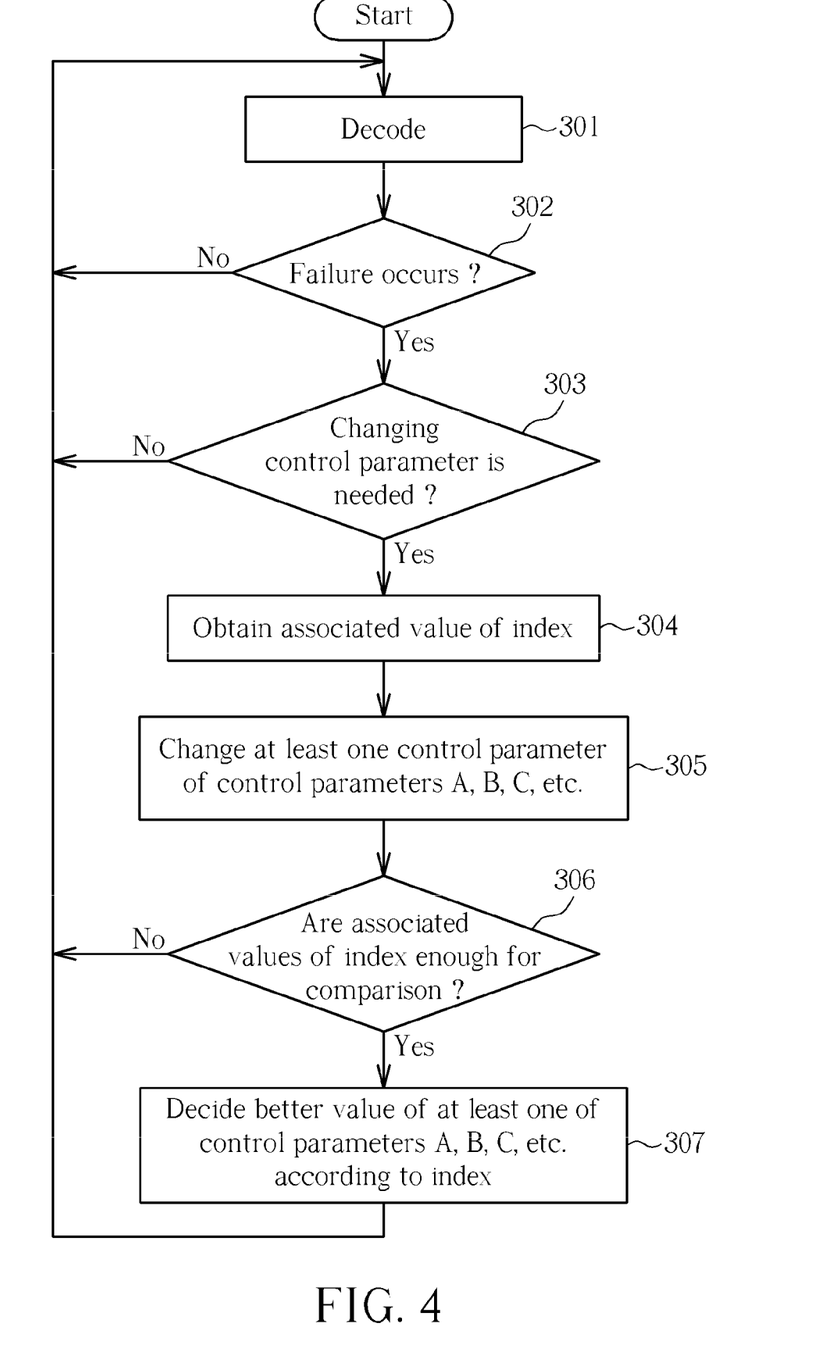
FIG. 4 illustrates a control procedure comprising implementation details of the method shown in FIG. 2 according to the embodiment shown in FIG. 3.

FIG. 4 illustrates a control procedure comprising implementation details of the method 910 shown in FIG. 2 according to the embodiment shown in FIG. 3.

In Step 301, the decoder 1282 decodes during a decoding operation of the optical storage apparatus 100.

In Step 302, the PTE device 140 determines whether a failure of the decoding operation occurs according to the index (e.g. an associated value thereof, such as an error rate). When the PTE device 140 determines that a failure of the decoding operation occurs, Step 303 is entered; otherwise, Step 301 is re-entered in order to decode another portion of data recorded on the optical disc 102.

In Step 303, the PTE device 140 determines whether changing the control parameters (such as that performed as shown in FIG. 3) is needed. When the PTE device 140 determines that changing the control parameters is needed, Step 304 is entered; otherwise, Step 301 is re-entered in order to repeat the decoding operation for the same portion of data recorded on the optical disc 102.

In Step 304, the PTE device 140 obtains an associated value of the index (e.g. an error rate).

In Step 305, the PTE device 140 changes at least one control parameter of the control parameters A, B, C, etc.

In Step 306, the PTE device 140 determines whether the associated values of the index are enough for comparison. When the PTE device 140 determines that the associated values of the index that have been obtained are enough for comparison, Step 307 is entered; otherwise, Step 301 is re-entered in order to repeat the decoding operation for the same portion of data recorded on the optical disc 102.

In Step 307, the PTE device 140 decides a better value of at least one of the control parameters A, B, C, etc. according to the index. Afterward, Step 301 is re-entered in order to perform the decoding operation for another portion of data recorded on the optical disc 102 (or repeat the decoding operation for the same portion of data recorded on the optical disc 102, when needed).

Figure 5:
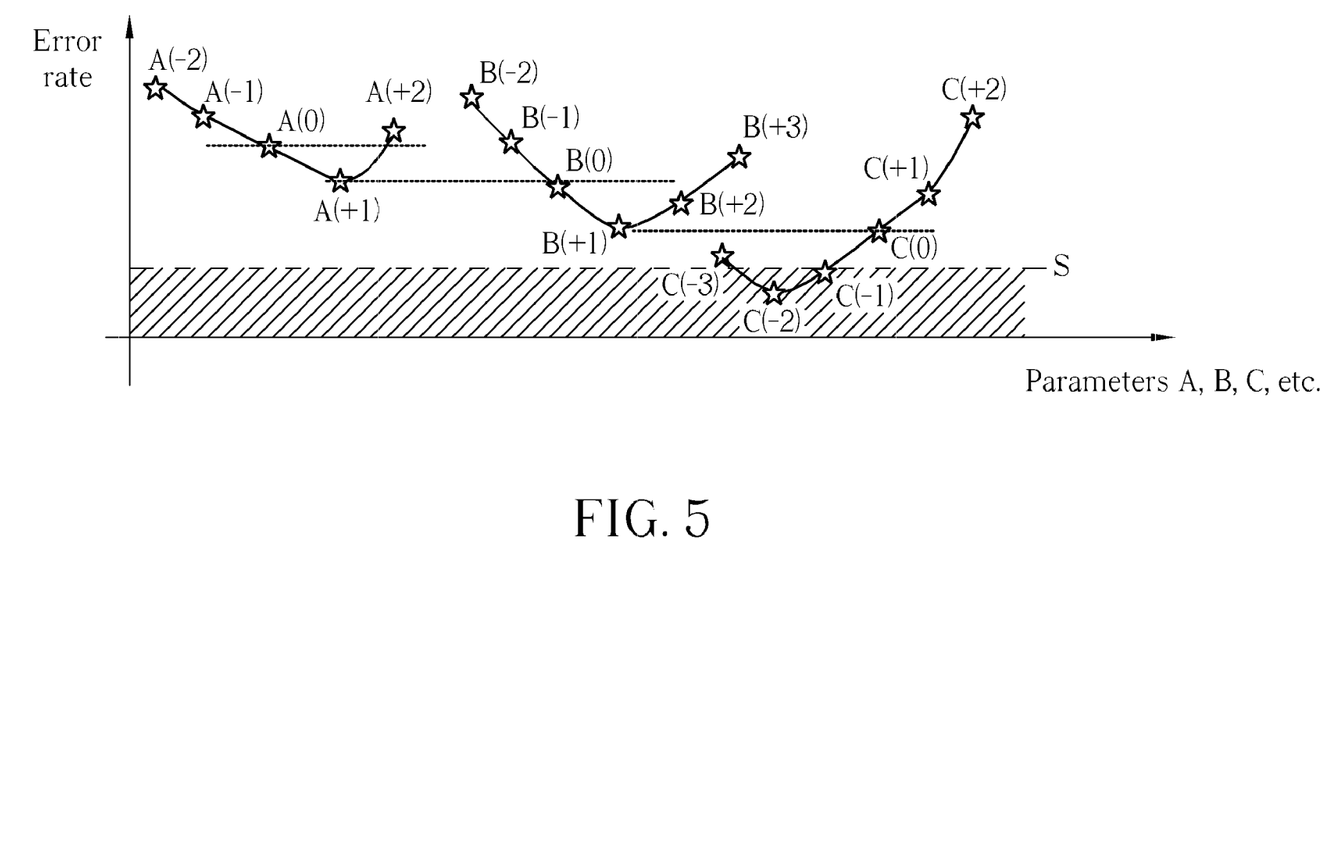
FIG. 5 illustrates associated values respectively obtained for some changed/unchanged values of the control parameters involved with the method shown in FIG. 2 according to another embodiment of the present invention.

FIG. 5 illustrates associated values respectively obtained for some changed/unchanged values of the control parameters A, B, C, etc. involved with the method 910 shown in FIG. 2 according to another embodiment of the present invention. This embodiment is a variation of the embodiment shown in FIG. 3. Please note that the notations A(0), B(0), and C(0) still represent the respective unchanged values of the control parameters A, B, and C, while the others such as {A(−2), A(−1), A(+1), A(+2)}, {B(−2), B(−1), B(+1), B(+2), B(+3)}, and {C(−3), C(−2), C(−1), C(+1), C(+2)} represent respective changed values of the control parameters A, B, and C.

According to this embodiment, the PTE device 140 changes the specific control parameter a plurality of times to determine a local optimal value of the specific control parameter. Taking the control parameter A as an example, at first the changed/unchanged values of the control parameter A comprise a first changed value A(−1), a second changed value A(+1), and an unchanged value A(0). As shown in FIG. 5, a second associated value obtained for the second changed value A(+1) is most close to the predetermined range among those respectively obtained for the first changed value A(−1) and the unchanged value A(0), which means the direction for finding the local optimal value of the control parameter A is toward the second changed value A(+1), the PTE device 140 increases the specific control parameter A to changed value A(+2). The associated value for A(+2) is found to be less close to the predetermined range than that obtained for the changed value A(+1), making the changed value A(+1) the local optimal value of the control parameter A. Compared to the embodiment shown in FIG. 3, the PTE device 140 of this embodiment searches for the local extreme value of the associated value (e.g. the local minimum value of the error rate), and the PTE device 140 of the embodiment of FIG. 3 changes the control parameter a predetermined number of times and selects one out of the changed/unchanged values.

The operations performed for the control parameter B are similar to those for the control parameter A, and therefore, are not repeated in detail here. Please note that, although the curve illustrated for the control parameter C crosses the dashed line labeled "S" twice, the PTE device 140 can still find the local optimal value of the control parameter C with the same method as that applied to the operations performed for the control parameter A. The control parameter C has a different direction for finding the local optimal value.

According to a variation of this embodiment, in a situation where none of the associated values respectively obtained for the changed/unchanged values {C(−3), C(−2), C(−1), C(0), C(+1), C(+2)} of the control parameter C falls within the shaded region shown in FIG. 5, given that the curve illustrated for the control parameter C is shifted upward, above the dashed line labeled "S", the control parameter C can be taken as an example for explaining some more implementation details. At first the changed/unchanged values of the control parameter C comprise a first changed value C(−1), a second changed value C(+1), and an unchanged value C(0). When a first associated value (e.g. an error rate, in this variation) obtained for the first changed value C(−1) is most close to the predetermined range among those respectively obtained for the second changed value C(+1) and the unchanged value C(0), which means the direction for finding the local optimal value of the control parameter C is toward the first changed value C(−1), the PTE device 140 continuously decreases the control parameter C until an associated value obtained for a last changed value C(−3) of the control parameter C is found to be less close to the predetermined range than that obtained for a previous changed value C(−2).

Figure 6:
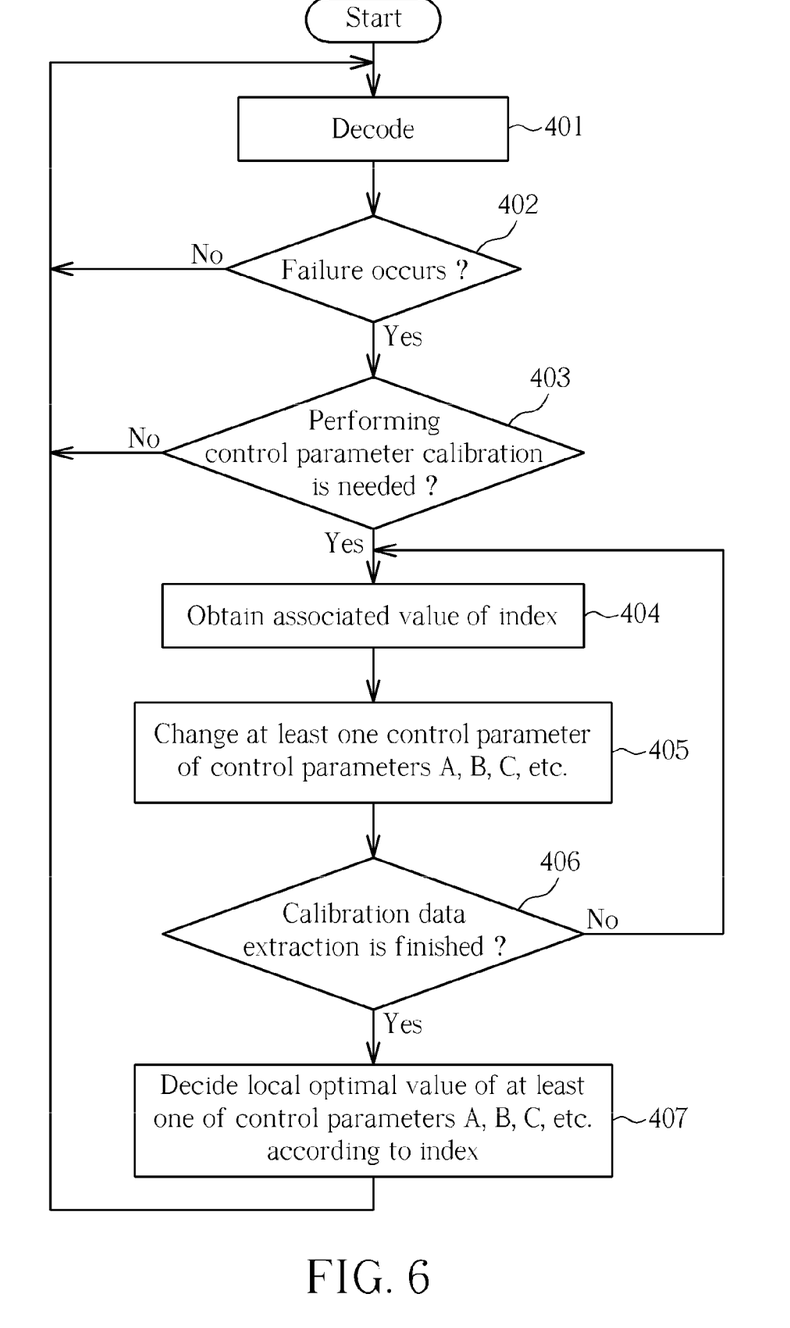
FIG. 6 illustrates a control procedure comprising implementation details of the method shown in FIG. 2 according to the embodiment shown in FIG. 5.

FIG. 6 illustrates a control procedure comprising implementation details of the method 910 shown in FIG. 2 according to the embodiment shown in FIG. 5.

In Step 401, the decoder 1282 decodes during a decoding operation of the optical storage apparatus 100.

In Step 402, the PTE device 140 determines whether a failure of the decoding operation occurs according to the index (e.g. an associated value thereof, such as an error rate). When the PTE device 140 determines that a failure of the decoding operation occurs, Step 403 is entered; otherwise, Step 401 is re-entered in order to decode another portion of data recorded on the optical disc 102.

In Step 403, the PTE device 140 determines whether performing control parameter calibration (such as that performed as shown in FIG. 5) is needed. When the PTE device 140 determines that performing control parameter calibration is needed, Step 404 is entered; otherwise, Step 401 is re-entered in order to repeat the decoding operation for the same portion of data recorded on the optical disc 102.

In Step 404, the PTE device 140 obtains an associated value of the index (e.g. an error rate).

In Step 405, the PTE device 140 changes at least one control parameter of the control parameters A, B, C, etc.

In Step 406, the PTE device 140 determines whether calibration data extraction is finished. When the PTE device 140 determines that calibration data extraction is finished (e.g. in a situation where an error rate corresponding to at least a local extreme value of the control parameter have been obtained and the error rate is within the acceptable error rate region), Step 407 is entered; otherwise, Step 404 is re-entered in order to continue the calibration data extraction.

In Step 407, the PTE device 140 decides a local optimal value for at least one of the control parameters A, B, C, etc. according to the index. Afterward, Step 401 is re-entered in order to perform the decoding operation for another portion of data recorded on the optical disc 102 (or repeat the decoding operation for the same portion of data recorded on the optical disc 102, when needed).

Figure 7:
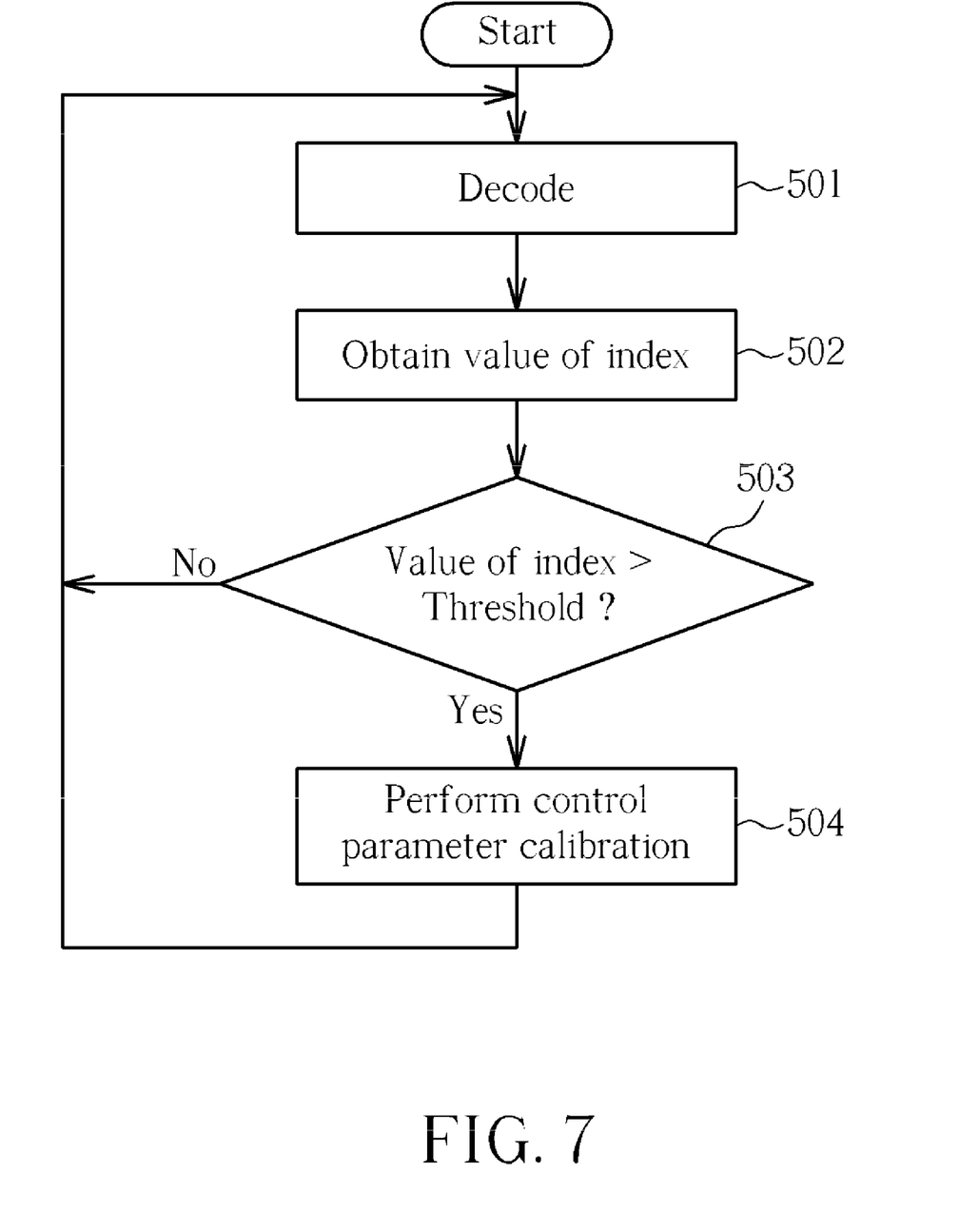
FIG. 7 illustrates a control procedure involved with the method shown in FIG. 2 according to an embodiment of the present invention.

FIG. 7 illustrates a control procedure involved with the method 910 shown in FIG. 2 according to an embodiment of the present invention. The control procedure is described as follows.

In Step 501, the decoder 1282 decodes during a decoding operation of the optical storage apparatus 100.

In Step 502, the PTE device 140 obtains a value of the index (e.g. an associated value of the index, such as an error rate).

In Step 503, the PTE device 140 determines whether the value of the index is greater than a threshold (e.g. the aforementioned predetermined threshold value). When the PTE device 140 determines that the value of the index is greater than the threshold, Step 504 is entered; otherwise, Step 501 is re-entered in order to decode another portion of data recorded on the optical disc 102.

In Step 504, the PTE device 140 performs the control parameter calibration. For example, the PTE device 140 can perform the control parameter calibration according to at least a portion of one or more of the embodiments/variations disclosed above. Afterward, Step 501 is re-entered in order to perform the decoding operation for another portion of data recorded on the optical disc 102 (or repeat the decoding operation for the same portion of data recorded on the optical disc 102, when needed).

Please note that the PTE device 140 of this embodiment can monitor the associated values of the index (e.g. error rates) for different portions of data recorded on the optical disc 102 during a series of decoding operations. When a series of error rates indicate a continuously increasing trend or an abrupt increment, the PTE device 140 can trigger the changing and setting operations of the control parameters (i.e. the changing operations and the setting operations disclosed in FIG. 2) before a decoding failure occurs.

According to some variations of this embodiment, the PTE device 140 can trigger the changing and setting operations of the control parameters according to a preset time or a preset data address in order to adjust one or more control parameters to a more appropriate value before decoding fails. In some embodiments, the changing and setting operations of the control parameters are performed periodically.

According to a variation of this embodiment, under the control of the PTE device 140, the changing and setting operations of the control parameters are arranged to be performed during a free period of the optical storage apparatus 100. For example, the free period represents a time period during which the optical storage apparatus 100 have a sufficient amount of decoded data for being played back. As the decoded data will not be used up during the free period, the optical storage apparatus 100 can continue playback of the decoded data while the changing and setting operations of the control parameters are performed in the background. Therefore, under the control of the PTE device 140, the probability of the occurrence of a decoding failure can be greatly decreased.

According to the embodiments/variations disclosed above, and more particularly, the embodiments shown in FIG. 4 and FIG. 6, Step 301 or Step 401 can be re-entered in order to repeat the decoding operation for the same portion of data that has not been successfully decoded, while the associated values of the index (e.g. error rates) are monitored for being compared. As a result, the present invention method and the associated optical storage apparatus can properly find the optimal value of each of the control parameters, and utilize the control parameters respectively having their optimal values to control the corresponding components of the optical storage apparatus during decoding, rather than changing only one control parameter while keeping all the other control parameters unchanged as suggested in the related art. Therefore, in contrast to the related art, the readability of the optical disc is greatly improved according to the present invention.

It is another advantage of the present invention that the present invention method and the associated optical storage apparatus can monitor the associated values of the index (e.g. error rates) for different portions of data recorded on the optical disc during a series of decoding operations, and trigger the changing and setting operations of the control parameters to be performed in the background. Therefore, the probability of the occurrence of a decoding failure can be greatly decreased according to the present invention.

Those skilled in the art will readily observe that numerous modifications and alterations of the device and method may be made while retaining the teachings of the invention.

What is claimed is:

1. A method for improving readability of an optical disc, the method comprising:
changing a first control parameter of an optical storage apparatus that accesses the optical disc and obtaining a plurality of associated values of an index corresponding to the readability of the optical disc for respective changed/unchanged values of the first control parameter;
setting the first control parameter to be an optimal value out of the changed/unchanged values of the first control parameter according to the associated values of the index;
changing a second control parameter of the optical storage apparatus with the first control parameter set to be the optimal value and obtaining a plurality of associated values of the index for respective changed/unchanged values of the second control parameter;
setting the second control parameter to be an optimal value out of the changed/unchanged values of the second control parameter according to the associated values of the index that are obtained for the respective changed/unchanged values of the second control parameter; and
utilizing the first and the second control parameters having their individual optimal values for further control during decoding.

2. The method of claim 1, further comprising:
generating at least a portion of the associated values of the index during a decoding operation.

3. The method of claim 2, further comprising:
monitoring the portion of the associated values of the index; and
triggering the changing and setting operations of the control parameters by comparing at least one associated value of the portion of the associated values or a derivative of the associated value with a predetermined threshold value.

4. The method of claim 1, further comprising:
when an associated value obtained for a changed/unchanged value of the second control parameter is found to be within a predetermined range of the index, determining the changed/unchanged value of the second control parameter to be the optimal value of the second control parameter.

5. The method of claim 1, wherein none of associated values respectively obtained for changed/unchanged values of the first control parameter is found to be within a predetermined range of the index; and the method further comprises:
when an associated value obtained for a changed/unchanged value of the first control parameter is found to be most close to the predetermined range among those respectively obtained for the other changed/unchanged values of the first control parameter, determining the changed/unchanged value of the first control parameter to be the optimal value of the first control parameter.

6. The method of claim 5, wherein the step of changing the first control parameter of the optical storage apparatus that accesses the optical disc and obtaining the plurality of associated values of the index corresponding to the readability of the optical disc for the respective changed/unchanged values of the first control parameter further comprises:
changing the first control parameter a predetermined number of times in order to determine the optimal value of the first control parameter, wherein the changed/unchanged values of the first control parameter comprise a predetermined number of changed values, and an unchanged value.

7. The method of claim 5, wherein the step of changing the first control parameter of the optical storage apparatus that accesses the optical disc and obtaining the plurality of associated values of the index corresponding to the readability of the optical disc for the respective changed/unchanged values of the first control parameter further comprises:

changing the first control parameter to determine a direction for finding the optimal value of the first control parameter, wherein at first the changed/unchanged values of the first control parameter comprise a first changed value, a second changed value, and an unchanged value between the first changed value and the second changed value, and the first changed value is less than the second changed value;

when a first associated value obtained for the first changed value is most close to the predetermined range among those respectively obtained for the second changed value and the unchanged value, continuously decreasing the first control parameter until an associated value obtained for a last changed value of the first control parameter is found to be less close to the predetermined range than that obtained for a previous changed value; and when a second associated value obtained for the second changed value is most close to the predetermined range among those respectively obtained for the first changed value and the unchanged value, continuously increasing the first control parameter until an associated value obtained for a last changed value of the first control parameter is found to be less close to the predetermined range than that obtained for a previous changed value.

8. The method of claim 1, wherein the first and the second control parameters comprise at least one servo parameter.

9. The method of claim 1, wherein the index represents an error rate of the optical storage apparatus.

10. The method of claim 1, wherein the index represents a jitter detection result of the optical storage apparatus.

11. The method of claim 1, wherein the index represents a measurement result of a radio frequency (RF) signal of the optical storage apparatus, or represents a measurement result of a derivative of the RF signal.

12. The method of claim 1, wherein the index represents a measurement result of a servo signal, or represents a measurement result of a derivative of the servo signal.

13. An optical storage apparatus, comprising:
a read channel arranged to read information from an optical disc, the read channel comprising a waveform equalizer, a slicer, a phase locked loop (PLL), and a demodulating and decoding module;
a servo control module arranged to perform servo control for the optical storage apparatus; and
a parameter tuning enhancement (PTE) device arranged to change a first control parameter of the optical storage apparatus that accesses the optical disc and obtain a plurality of associated values of an index corresponding to readability of the optical disc for respective changed/unchanged values of the first control parameter, wherein the PTE device is further arranged to set the first control parameter to be an optimal value out of the changed/unchanged values of the first control parameter according to the associated values of the index, the PTE device changes a second control parameters of the optical storage apparatus with the first control parameter set to be the optimal value and obtains a plurality of associated values of the index for respective changed/unchanged values of the second control parameters, and the PTE device is further arranged to set the second control parameter to be an optimal value out of the changed/unchanged value of the second control parameter according to the associated values of the index that are obtained for the respective changed/unchanged values of the second control parameter;

wherein the first and the second control parameters are utilized for controlling at least a portion of the waveform equalizer, the slicer, the PLL, the demodulating and decoding module, and the servo control module.

14. The optical storage apparatus of claim 13, wherein a portion of the optical storage apparatus is arranged to generate at least a portion of the associated values of the index during a decoding operation.

15. The optical storage apparatus of claim 14, wherein the PTE device is arranged to monitor the portion of the associated values of the index; and the PTE device triggers the changing and setting operations of the control parameters by comparing at least one associated value of the portion of the associated values or a derivative of the associated value with a predetermined threshold value.

16. The optical storage apparatus of claim 13, wherein when an associated value obtained for a changed/unchanged value of the second control parameter is found to be within a predetermined range of the index, the PTE device determines the changed/unchanged value of the second control parameter to be the optimal value of the second control parameter.

17. The optical storage apparatus of claim 13, wherein none of associated values respectively obtained for changed/unchanged values of the first control parameter is found to be within a predetermined range of the index; and when an associated value obtained for a changed/unchanged value of the first control parameter is found to be most close to the predetermined range among those respectively obtained for the other changed/unchanged values of the first control parameter, the PTE device determines the changed/unchanged value of the first control parameter to be the optimal value of the first control parameter.

18. The optical storage apparatus of claim 17, wherein the PTE device changes the first control parameter a predetermined number of times in order to determine the optimal value of the first control parameter; and the changed/unchanged values of the first control parameter comprise a predetermined number of changed values, and an unchanged value.

19. The optical storage apparatus of claim 17, wherein the PTE device changes the first control parameter to determine a direction for finding the optimal value of the first control parameter; at first the changed/unchanged values of the first control parameter comprise a first changed value, a second changed value, and an unchanged value between the first changed value and the second changed value, and the first changed value is less than the second changed value; when a first associated value obtained for the first changed value is most close to the predetermined range among those respectively obtained for the second changed value and the unchanged value, the PTE device continuously decreases the first control parameter until an associated value obtained for a last changed value of the first control parameter is found to be less close to the predetermined range than that obtained for a previous changed value; and when a second associated value obtained for the second changed value is most close to the predetermined range among those respectively obtained for the first changed value and the unchanged value, the PTE device continuously increases the first control parameter until an associated value obtained for a last changed value of the first control parameter is found to be less close to the predetermined range than that obtained for a previous changed value.

20. The optical storage apparatus of claim 13, wherein the first and the second control parameters comprise at least one servo parameter for controlling the servo control module.

21. The optical storage apparatus of claim 13, wherein the index represents an error rate of the optical storage apparatus; and the error rate is generated by the demodulating and decoding module.

22. The optical storage apparatus of claim 13, wherein the index represents a jitter detection result of the optical storage apparatus.

23. The optical storage apparatus of claim 13, wherein the index represents a measurement result of a radio frequency (RF) signal of the optical storage apparatus, or represents a measurement result of a derivative of the RF signal.

24. The optical storage apparatus of claim 13, wherein the index represents a measurement result of a servo signal of the servo control module, or represents a measurement result of a derivative of the servo signal.

25. The optical storage apparatus of claim 13, wherein the optical storage apparatus is a control circuit positioned within an optical disc drive.

\* \* \* \* \*